United States Patent [19]

Klas

[11] Patent Number: 5,064,226
[45] Date of Patent: Nov. 12, 1991

[54] NONMETALLIC CONDUIT FITTING WITH TRANSVERSE BIASING ABUTMENTS

[75] Inventor: Daniel E. Klas, North Kingstown, R.I.

[73] Assignee: Hubbell Incorporated, Orange, Conn.

[21] Appl. No.: 530,283

[22] Filed: May 30, 1990

[51] Int. Cl.$^5$ ............................................. F16L 27/00
[52] U.S. Cl. .................................... 285/184; 285/423; 285/175; 285/921; 285/907
[58] Field of Search ............... 285/181, 168, 184, 232, 285/321, 907, 278, 279, 280

[56] References Cited

U.S. PATENT DOCUMENTS

| 132,604 | 10/1872 | Smith et al. | 285/184 |
|---|---|---|---|
| 327,877 | 10/1885 | Hodges | 285/184 |
| 1,347,660 | 7/1920 | Reiband | 285/184 |
| 1,880,098 | 9/1932 | Mair | 285/184 |
| 2,124,474 | 7/1938 | Scholtes | 285/184 |
| 2,255,262 | 9/1941 | MacFadden | 285/907 |
| 2,447,947 | 8/1948 | Larson et al. | 285/184 |
| 2,479,580 | 8/1949 | Marco | 285/181 |
| 2,557,507 | 6/1951 | Lang, Jr. | 285/184 |
| 2,731,234 | 4/1952 | Bily | 285/181 X |
| 2,791,451 | 5/0019 | 57Rostan | 285/181 |
| 3,561,726 | 2/1971 | Iannelli | 285/260 X |
| 4,676,241 | 6/1987 | Webb et al. | 285/168 |
| 4,711,472 | 12/1987 | Schnell | 285/162 |
| 4,807,370 | 2/1989 | Trimble | 285/181 X |
| 4,886,938 | 12/1989 | Rottmar et al. | 285/907 X |
| 4,889,368 | 12/1989 | Laipply | 285/321 X |

FOREIGN PATENT DOCUMENTS 954176 12/1956 Fed. Rep. of Germany ...... 285/907

OTHER PUBLICATIONS

"Heyco Liquid Tight Right Angle Fittings for Cords", Catalog 190 Heyco Molded Products Inc., p. 24, 1989.

*Primary Examiner*—Dave W. Arola
*Assistant Examiner*—Tim Aberle
*Attorney, Agent, or Firm*—Jerry M. Presson; David L. Tarnoff

[57] ABSTRACT

A nonmetallic conduit fitting having first and second tubular members rotatably coupled about a transverse axis of rotation allowing the fitting to be used in a straight or in angled positions. The first tubular member has a plurality of latching tabs with each latching tab having a first surface that rotatably and slidably engages a second surface on a flange extending from the second tubular member via a snap fit. The first surfaces of the latching tabs and the second surface of the flange define a plane of rotation therebetween which is substantially perpendicular to the axis of rotation. In the first embodiment, the latching tabs of the first tubular member engage an inwardly extending flange on the second tubular member via a snap fit. Abutment members are provided on the inwardly extending flange for engaging the gaps between the latching tabs to selectively retain the first and second tubular members in a straight or angled position. In the second embodiment, the first tubular member includes an annular wall having a plurality of latching tabs that engage an outwardly extending flange of the second tubular member via a snap fit. An abutment member on the first tubular member engages notches formed on the peripheral surface of the outwardly extending flange for selectively retaining the first and second tubular members in a straight or angled position.

36 Claims, 3 Drawing Sheets

NONMETALLIC CONDUIT FITTING WITH TRANSVERSE BIASING ABUTMENTS

FIELD OF THE INVENTION

The invention relates to a nonmetallic conduit fitting for receiving electrical wires therethrough. More particularly, the invention relates to a nonmetallic, liquidtight conduit fitting that allows the user to insert wires in a straight position and then rotate the fitting to a desired angle.

BACKGROUND OF THE INVENTION

In electrical wiring, conduit fittings are used for connecting electrical conduits to outlets, fixture boxes, junction boxes, and the like. In many applications, it is often desirable to have a conduit fitting that includes a bend or an angle. Previously, suppliers and installers of electrical equipment have been required to keep an inventory of both straight fittings and fittings with various particular angles in order to meet various requirements.

Numerous conduit fittings have been developed that can be rotated for use as both a straight conduit fitting and an angled conduit fitting. However, these prior conduit fittings suffer from many disadvantages. For example, many of the prior conduit fittings are difficult to install due to their complexity and inability to be easily and readily secured at the desired angle. In particular, the installer must hold the conduit fitting in one hand at the desired angle and with the other hand manipulate the securing mechanism for locking the conduit fitting at the desired angle. Moreover, these prior conduit fittings are often very expensive and/or difficult to manufacture.

Examples of such prior pipe or conduit fittings are disclosed in U.S. Pat. No. 132,604 to Smith et al; U.S. Pat. No. 327,877 to Hodges; U.S. Pat. No. 1,347,660 to Reiband, U.S. Pat. No. 1,880,098 to Mair; U.S. Pat. No. 2,124,474 to Scholtes; U.S. Pat. No. 2,255,262 to MacFadden; U.S. Pat. No. 2,447,947 to Larson et al; U.S. Pat. No. 2,479,580 to Marco; U.S. Pat. No. 2,557,507 to Lang, Jr.; U.S. Pat. No. 2,791,451 to Rostan; U.S. Pat. No. 4,676,241 to Webb et al; and U.S. Pat. No. 4,711,472 to Schnell. Another example of a prior conduit fitting is disclosed in German Patent No. DT 954,176, which issued on Dec. 13, 1956.

Accordingly, there is a need for a conduit fitting that can be easily and readily assembled and installed at any desired angle and that will stay at that angle until moved. Further, there is a need for a conduit fitting that is inexpensive to manufacture.

This invention addresses these problems and needs in the art, along with other problems and needs which will become apparent to those skilled in the art once given this disclosure.

SUMMARY OF THE INVENTION

Accordingly, it is a primary object to provide a nonmetallic conduit fitting that is easily and readily assembled and installed at a variety of angles.

Another object of the invention is to provide a nonmetallic conduit fitting that is assembled by a snap fit along its plane of rotation to allow for electrical wires to be fed therethrough at a straight angle and which thereafter can be rotated to an angled position.

A further object is to provide a conduit fitting that provides a conduit fitting that maintains a liquidtight seal in a variety of angular positions.

A further object of the invention is to provide a nonmetallic conduit fitting that is relatively simple and inexpensive to manufacture, assemble and install.

The foregoing objects are basically attained by providing a conduit fitting for receiving electrical wires therethrough, the combination comprising: a first tubular member having a first end portion, a middle portion and a second end portion with a first longitudinal axis extending between the first and second end portions; a second tubular member having a first end portion, a middle portion and a second end portion with a second longitudinal axis extending between the first and second end portions of the second tubular member; first and second portions coupled to the first and second tubular members for rotatably coupling the first end portions of the first and second tubular members together about an axis of rotation extending transversely to the first and second longitudinal axes and for resisting relative translational movement of the first and second tubular members away from one another, the portions for rotatably coupling include a first surface coupled to the first end portion of the first tubular member, a second surface coupled to the first end portion of the second tubular member and facing in a direction opposite the first surface for slidable engagement with the first surface, the first and second surfaces defining a plane of rotation substantially perpendicular to the axis of rotation, and the first tubular member having a resilient portion coupling the first surface to the first end portion of the first tubular member, whereby said first and second tubular members can be rotated relative to each other between a first position where the first and second longitudinal axes are substantially parallel to form a substantially straight passageway between the first and second tubular members and a plurality of angular positions where the first and second longitudinal axes are not substantially parallel.

The foregoing objects are also basically attained by a method of angulating a conduit fitting for receiving electrical wires therethrough, comprising the steps of coupling a first tubular member having a resilient coupling member with a first coupling surface to a second tubular member having a second coupling surface thereon for forming a substantially straight passageway between the first and second tubular members, by transversely biasing the first coupling surface relative to the second coupling surface during coupling of the first and second tubular member and for defining a plane of rotation between said first and second coupling surfaces, inserting electrical wires through the substantially straight passageway of the first and second tubular members, and rotating the first tubular member relative to the second tubular member about the plane of rotation to angulate the first tubular member relative to the second tubular member at the plane of rotation.

Other objects, advantages and salient features of the invention will become apparent from the following detailed description, which, taken in conjunction with the annexed drawings, discloses two preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
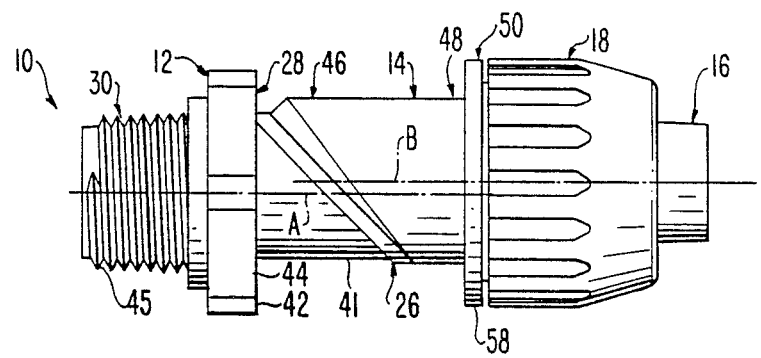
FIG. 1 is a side elevational view of the nonmetallic conduit fitting in accordance with the present invention.
Figure 2:
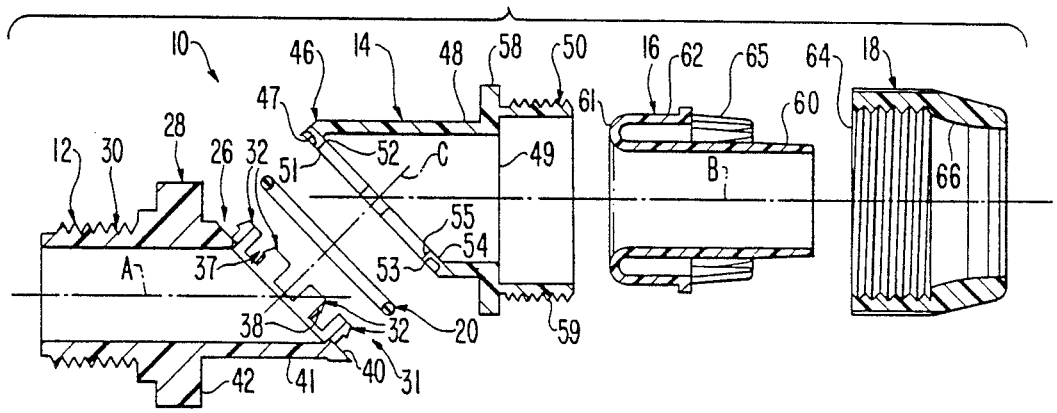
FIG. 2 is an exploded side elevational view in longitudinal cross section of the conduit fitting shown in FIG. 1.

Referring initially to FIGS. 1 and 2, a conduit fitting 10, in accordance with the present invention, is illustrated and includes a first tubular member 12 and a second tubular member 14, which are rotatably coupled about a plane of rotation X by a snap fit.

Figure 6:
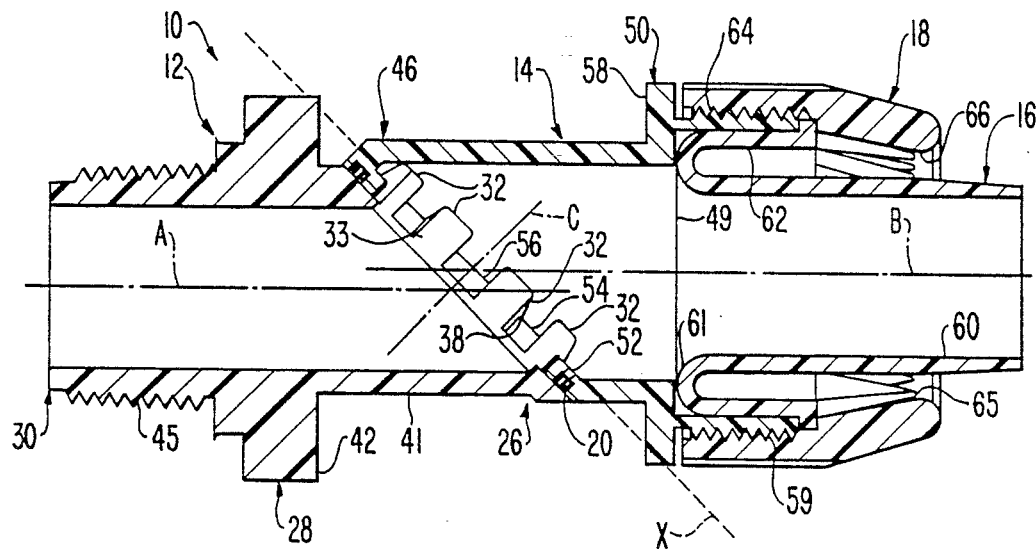
FIG. 6 is a side elevational view of the conduit fitting of FIG. 1 in longitudinal cross section showing the first and second tubular members positioned to form a straight conduit fitting.

First tubular member 12 has a longitudinal axis A, which is substantially parallel to the longitudinal axis B of second tubular member 14, when conduit fitting 10 is in its straight position as seen in FIGS. 1 and 6. First and second tubular members 12 and 14 are rotatably coupled about an axis of rotation C, which transversely intersects longitudinal axes A and B, preferably at about an angle of 45°. Accordingly, conduit fitting 10 may be adjusted to create any angle from 0° to about 90° by merely rotating first tubular member 10 relative to second tubular member 12.

Conduit fitting 10 also preferably includes a ferrule 16 and a nut 18 for releasably coupling a conduit to the second tubular member 14. Preferably, first tubular member 12, second tubular member 14, ferrule 16 and nut 18 are all made of a suitable plastic material, such as polyvinylchloride, nylon, polypropylene or polyethylene.

Conduit fitting 10 may also include an O-ring 20 made of elastomeric material which is positioned between first tubular member 12 and second tubular member 14 for providing a liquidtight seal therebetween.

Figure 3:
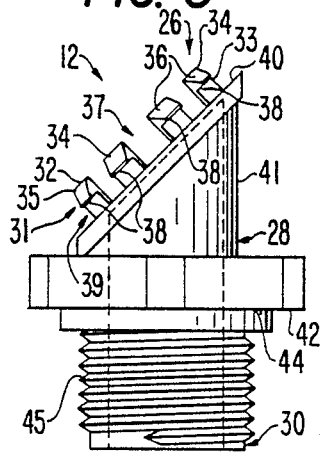
FIG. 3 is a side elevational view of the first tubular member.
Figure 4:
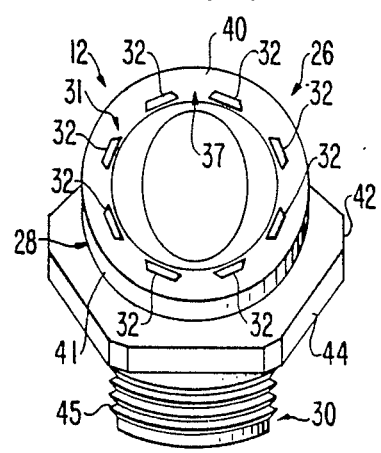
FIG. 4 is a front perspective view of the first tubular member shown in FIGS. 1-3 as viewed along the transverse axis of rotation.

As shown in FIGS. 2-4, the first tubular member 12 is formed as a one-piece, unitary, integrally molded member, and includes a first end portion 26, a middle portion 28 and a second end portion 30 with longitudinal axis A extending between the first and second end portions 26 and 30 and through the middle portion 28.

First end portion 26 includes a resilient coupling member 31 made up of a plurality of equally spaced apart latching tabs 32 which are arranged substantially in a circular array. Latching tabs 32 extend outwardly from first end portion 26 of first tubular member 12 in a direction substantially parallel to axis C. Each latching tab 32 is spaced from the adjacent latching tab 32 by a gap 37. Each latching tab 32 has a resilient wall segment 33 fixedly coupled to an annular surface 40 of first end portion 26 and a tooth 34 formed on the exterior surface of wall segment 33 at its distal end 35. While eight latching tabs 32 are shown, it will be apparent to those skilled in the art that any number may be used.

Each tooth 34 has an inclined wall 36 and a planar first surface portion 38. Inclined wall 36 slopes outwardly away from the distal end 35 of wall segment 33 and towards annular surface 40, while first surface portion 38 extends between inclined wall 36 and resilient wall segment 33. First surface portions 38 are bearing surfaces, which are substantially perpendicular to the axis of rotation C and faces annular surface 40.

First surface portions 38 of each latching tab 32, together with resilient wall segments 33, form a notch 39.

Teeth 34 are arranged substantially in a circular array, which forms a maximum diameter of coupling member 31 that is greater than the internal diameter of the inwardly extending flange 52 for providing a snap fit between the flange 52 and the notch 39.

Middle portion 28 of first tubular member 12 has a tubular section 41 and an annular ring 42 having a plurality of straight surfaces 44 forming substantially a hexagonal ring for engaging a tool such as a wrench.

Second end portion 30 of first tubular member 12 has external threads 45 for threadedly engaging a connection box or other device (not shown). It will be apparent to those skilled in the art that middle portion 28 and second end portion 30 of first tubular member 12 may be replaced by any known means for coupling first end portion 26 to a connection box or other device.

Figure 5:
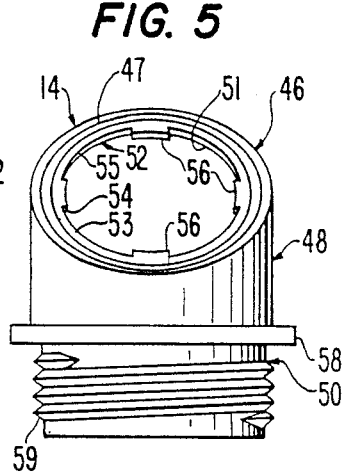
FIG. 5 is a front elevational view of the second tubular member shown in FIGS. 1 and 2.

Referring now to FIGS. 2 and 5, second tubular member 14 includes a first end portion 46, a middle portion 48 and a second end portion 50. Second tubular member 14 is formed as a one-piece, unitary, integrally molded member. First end portion 46 has a substantially circular opening 51 when viewed along the axis of rotation C, while middle portion 48 has an elliptical cross section when viewed along longitudinal axis B. Circular opening 51 is defined by an inwardly extending annular flange 52 for rotatably engaging notch 39 formed by latching tabs 32 of first tubular member 12.

Flange 52 includes an outer or first planar surface 53, an inner or second planar surface 54 and a middle or third surface 55 interconnecting first and second surfaces 53 and 54 for defining opening 51.

Opening 51 has an internal diameter which is slightly smaller than the maximum diameter of coupling member 31, which is formed by teeth 34 of first tubular member 12 for providing a snap fit between first and second tubular members 12 and 14. Second surface 54 faces in a direction opposite from first surface portions 38 of first tubular member 12 for slidable and rotatable engagement with first surface portions 38. Accordingly, first surface portions 38 and second surface 54 are bearing surfaces.

Figure 7:
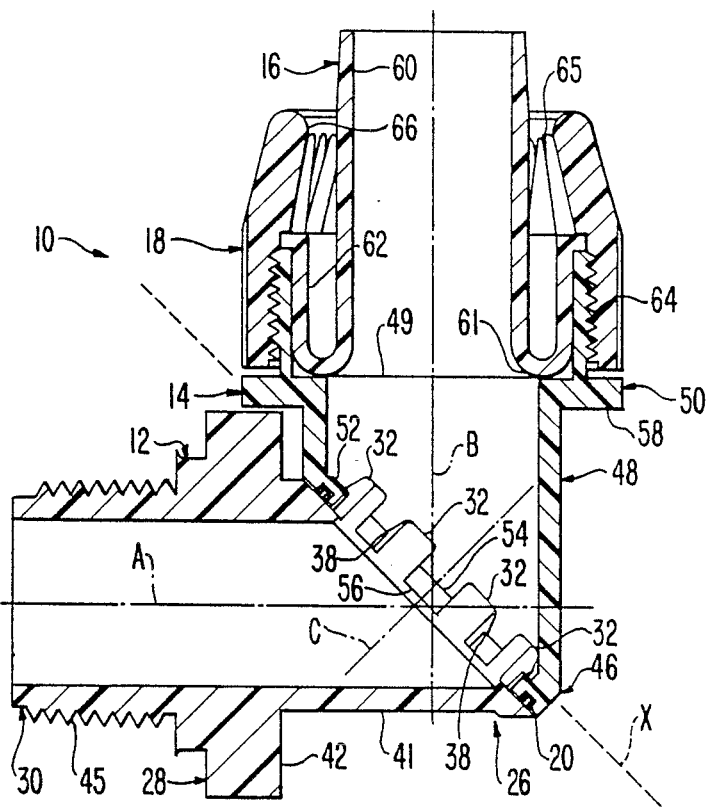
FIG. 7 is a side elevational view of the conduit fitting of FIG. 1 in longitudinal cross section showing the first and second members positioned to form a 90° conduit fitting.

Flange 52 also includes four equally spaced apart abutment members 56 formed on third surface 55 for selectively indexing the angular position of first and second tubular members 12 and 14. In particular, each abutment member 56 is received in one of the gaps 37 formed between latching tabs 32 when first and second tubular members 12 and 14 are coupled together for selectively retaining first and second tubular members 12 and 14 in one of the plurality of angular positions such as those shown in FIGS. 6 and 7. It will be apparent to those skilled in the art that the number and the placement of latching tabs 32 and abutment members 56 will determine the number of angular positions available.

First end portion 46 of second tubular member 14 may also include a groove 47 formed in first surface 53 for receiving an O-ring 20 to provide a liquidtight seal between annular surface 40 of first tubular member 12 and first surface 53 of second tubular member 14.

Second end portion 50 of second tubular member 14 is substantially circular in cross section with its inner diameter slightly larger than the elliptical passageway of the middle portion 48 for defining an abutment surface 49 at the junction thereof. Second end portion 50 also has an outwardly extending flange 58 and external threads 59 for engaging nut 18.

Referring again to FIGS. 2 and 6, ferrule 16 is releasably coupled to second end portion 50 of second tubular member 14, and includes an inner tubular portion 60, a middle connecting portion 61 and an outer tubular portion 62. Ferrule 16 has a longitudinal axis extending therethrough which, when coupled to second tubular member 14, is coaxially aligned with longitudinal axis B. Preferably, ferrule 16 is formed as a one-piece, unitary, integrally molded member.

Middle connecting portion 61 of ferrule 16 interconnects inner tubular portion 60 with outer tubular portion 62, and is adapted to abut against abutment surface 49 when received within second end portion 50 of second tubular member 14. Outer tubular portion 62 is reflexed back upon and extends coaxially to inner tubular portion 60, and includes a plurality of spaced apart resilient tines 65 extending longitudinally therefrom.

Nut 18 has an axially extending bore with a threaded portion 64 for threadedly engaging external threads 59 of second tubular member 14 and an annular tapered wall portion 66 for engaging tines 65 of ferrule 16. Wall portion 66 tapers from a maximum internal diameter adjacent to threaded portion 64 to a minimum internal diameter which is smaller than the diameter formed by resilient tines 65 of ferrule 16. The length of external threads 59 of second end portion 50 and internal threads 64 of nut 18 are of a sufficient length to cause resilient tines 65 to engage tapered wall portion 66 of nut 18 for compressing tines 65 inwardly.

An electrical conduit (not shown) carrying wires (not shown) is coupled to second end portion 50 of second tubular member by ferrule 16 and nut 18. In particular, the distal end of the conduit is inserted into the cylindrical space formed between inner and outer tubular portions 56 and 60 of ferrule 16, and then nut 18 is threaded onto external threads 59 of second tubular member 14 to cause resilient tines 65 to be compressed against the conduit by tapered wall 66 of the nut 18. The result is a substantially watertight connection between the conduit and the conduit fitting 10. It will be apparent to those skilled in the art that any suitable means for receiving the conduit and the electrical wires contained therein may be used in place of the second end portion 50 of the second tubular member 14, the ferrule 16 and the nut 18.

Assembly of Conduit Fitting 10

Conduit fitting 10 is assembled by first positioning O-ring 20 in annular groove 47 of second tubular member 14. Then, first and second tubular members 12 and 14 are snap fit together via latching tabs 32 of first tubular member 12 engaging flange 52 of second tubular member 14. Annular surface 40 of first tubular member 12 contacts O-ring 20 to provide a liquidtight connection between first and second tubular members 12 and 14.

In particular, first and second tubular members 12 and 14 are snap fit together by applying forces along the axis of rotation C. These forces cause inclined walls 36 of latching tabs 32 to contact the inwardly facing third surface 55 of flange 52, thereby initially transversely biasing first surface portions 38 of latching tabs 32 inwardly away from second surface 54 of flange 52 due to resilient wall segments 33 of latching tabs 32 being deformed elastically inwardly to allow flange 42 to enter notch 39, whereupon latching tabs 32 snap outwardly for engaging and interlocking first surface portions 38 of latching tabs 32 with second surface 53 of flange 52.

Accordingly, first surface portions 38 of latching tabs 32 slidably and rotatably engage second surface 53 of flange 52 to rotatably couple first and second tubular members 12 and 14 together about the axis of rotation C, and to resist relative translational movement of the first and second tubular members 12 and 14 away from each other.

First surface portions 38 and second surface 53 define a plane of rotation X that is substantially perpendicular to the axis of rotation C. Preferably, the plane of rotation X forms an angle of about 45° with the first and second longitudinal axes A and B.

When coupled, first and second tubular members 12 and 14 may be rotated relative to each other about the axis of rotation C for changing the angular orientation of axis A relative to axis B to obtain the desired angle of conduit fitting 10. The number of angular positions available depends upon on the number and the placement of latching tabs 32 on first tubular member 12 which engage abutment members 56 on second tubular member 14. Accordingly, abutment members 56 extending inwardly from flange 52 contact resilient wall segments 33 of latching tabs 32 to impede the relative rotational motion of first and second tubular members 12 and 14 until sufficient torquing force is applied to cause resilient latching tabs 32 to flex inwardly to allow abutment members 56 to rotate past the resilient latching tabs 32.

First tubular member 12 is now threadedly coupled to a connection box or other device while conduit fitting 10 is in its straight position. An electrical conduit is fed through nut 18 when it is uncoupled from second tubular member 14 and wires from the conduit are fed through the passageway and into the connection box or other device. The conduit is then fed over ferrule 16 so that that end of the conduit is positioned in the space between inner tubular portion 60 and the outer tubular portion 62. Nut 18 is then threadedly engaged to second tubular member 14 so that the tapered wall portion 66 compresses against the angled tines 65 of ferrule 16 to compress tines 65 against the conduit for holding the conduit in place. First and second tubular members 12 and 14 of the conduit fitting 10 are then rotated to the desired angular position.

Second Embodiment of FIGS. 8-12

Referring now to FIGS. 8-12, a second and preferred embodiment of a conduit fitting 110 is shown in accordance with the present invention. Conduit fitting 110 differs from conduit fitting 10 only in the particular structure used in rotatably coupling the first end portions of the first and second tubular members together. Other aspects of conduit fitting 110 are substantially identical to conduit fitting 10 and will not be discussed further in detail.

Figure 8:
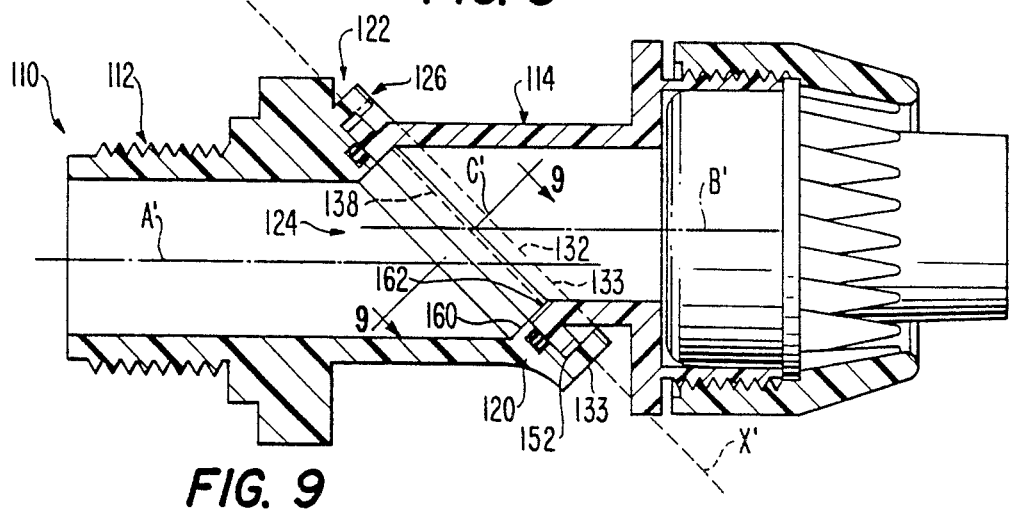
FIG. 8 is a side elevational view in longitudinal cross section of a second embodiment of the conduit fitting in accordance with the present invention.
Figure 9:
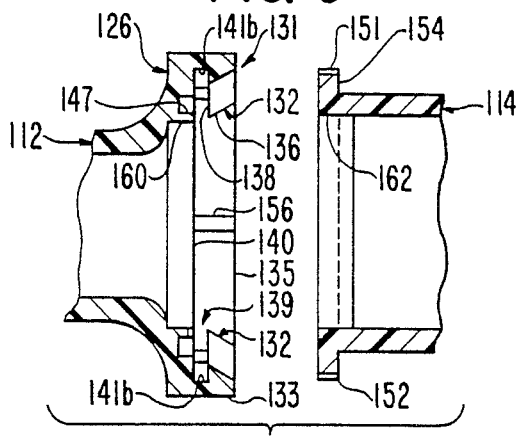
FIG. 9 is a partial exploded side elevational view in cross section taken along line 9—9 of the second embodiment of the conduit fitting shown in FIG. 8.

As seen in FIGS. 8 and 9, conduit fitting 110 includes a first tubular member 112 having a first longitudinal axis A' and a second tubular member 114 having a second longitudinal axis B'. The first and second tubular members 112 and 114 are rotatably coupled about an axis of rotation C' which transversely intersects longitudinal axes A' and B'. Preferably, the axis of rotation C' forms an angle of about 45° with longitudinal axes A' and B'.

Figure 10:
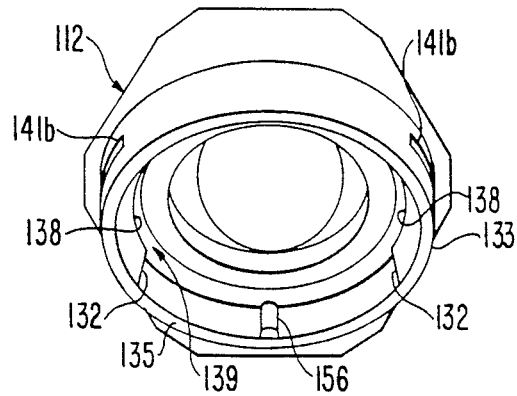
FIG. 10 is a side elevational view of the second embodiment of the first tubular member of FIGS. 8 and 9.
Figure 11:
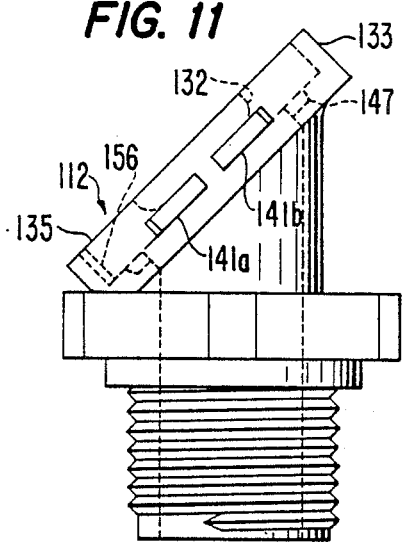
FIG. 11 is a top plan view of the second embodiment of the first tubular member of FIGS. 8-10 viewed along its longitudinal axis.

As seen in FIGS. 10 and 11, first tubular member 112 has a first end portion 126 having an annular surface 140 and a resilient coupling member 131 formed by an annular wall 133 extending outwardly from first end portion 126 to a free distal end 135. Annular wall 133 has a maximum inner diameter greater than the maximum outer diameter of flange 152. Annular wall 133 has a pair of latching tabs 132 on its interior surface.

Latching tabs 132 define an opening having a diameter which is less than the maximum outer diameter of outwardly extending flange 152 for providing a snap fit between flange 152 and notch 139. While only two latching tabs 132 are shown, any number may be used. Each latching tab 132 includes an inclined wall 136 sloping inwardly away from the distal end 135 and a first surface portion 138 extending between inclined wall 136 and annular wall 133.

First surface portion 138 is substantially perpendicular to the transverse axis C' and faces annular surface 140. First surfaces 138, together with annular wall 133 and annular surface 140 form a notch 139 for receiving the outwardly extending flange 152 of second tubular member 114, shown in FIGS. 8 and 9.

First end portion 126 further includes two pairs of cutouts 141a and 141b in annular wall 133 between first surface portions 138 and annular surface 140 to provide additional resiliency to annular wall 133 adjacent latching tabs 132. Annular wall 133 also has an inwardly extending abutment member 156.

First tubular member 112 may also include a groove 147 formed in annular surface 140 for receiving an O-ring 120.

Figure 12:
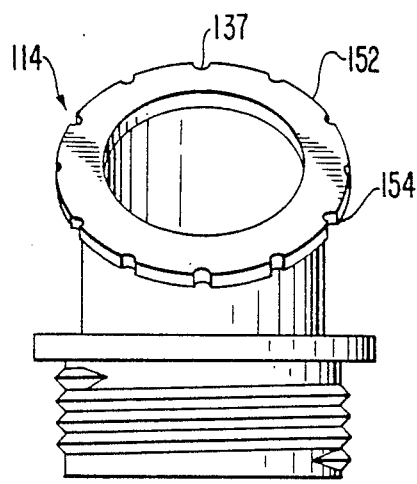
FIG. 12 is a front elevational view of the second tubular member of the second embodiment of FIGS. 8 and 9.

As seen in FIGS. 9 and 12, flange 152 extends outwardly from first end portion 146 of second tubular member 114. Flange 152 includes a peripheral surface 151 having a maximum diameter greater than the diameter of the opening defined by latching tabs 132 of first tubular member 112. Flange 152 also includes a second surface 154 facing in a direction opposite first surfaces 138 of first tubular member 112 for slidable and rotatable engagement therewith.

Flange 152 includes a plurality of spaced apart notches 137 on its peripheral surface 151 for engaging abutment member 156 formed on the inner surface of annular wall 132 of first tubular member 112 when first and second tubular members 112 and 114 are coupled together for selectively and releasably retaining first and second members 112 and 114 in a plurality of angular positions ranging from an angle of 0° to about 90°. Accordingly, first and second members 112 and 114 are coupled together for incremental rotation. Notches 137 form inwardly directed abutment surfaces for engaging abutment member 156.

First and second tubular members 112 and 114 are snap fit together by applying forces along the axis of rotation C'. These forces cause inclined walls 136 of latching tabs 132 of first tubular member 112 to contact peripheral surface 151 of flange 152 of second tubular member 114, thereby initially transversely biasing first surfaces 138 of latching tabs 132 outwardly away from second surface 153 of flange 152 due to resilient annular wall 133 being deformed elastically outwardly to allow flange 152 to enter notch 139, whereupon annular wall 133 snaps with latch tabs 132 inwardly for engaging and interlocking first surfaces 138 of latching tabs 132 with second surface 153 of flange 152.

Accordingly, first surfaces 138 of latching tabs 132 slidably and rotatably engage second surface 153 of flange 152 to rotatably couple first and second tubular members 112 and 114 together about the axis of rotation C' and to resist relative translational movement of first and second tubular members 112 and 114 away from each other. The first surfaces 138 and second surface 153 define a plane of rotation that is substantially perpendicular to the axis of rotation C'. Preferably, the plane of rotation X' forms an angle of about 45° with longitudinal axes A' and B'.

The second embodiment is preferred over the first embodiment because it does not have latching tabs that could obstruct the substantially straight passageway 124 between the first and second tubular members 112 and 114 when coupled together. In particular, first tubular member 112 has an inner annular surface 160 adjacent its free end, which meets with an inner annular surface 162 on second tubular member 114 for providing a smooth transition therebetween. This allows smooth feeding of electrical wires through conduit fitting 110. While annular surfaces 160 and 162 are illustrated as cylindrical surfaces, which are angled at 135° to longitudinal axes A' and B', it should be understood that surfaces 160 and 162 can be curved.

While only two embodiments have been chosen to illustrate the invention, it will be understood by those skilled in the art that various changes and modifications can be made therein without departing from the scope of the invention as defined in the appended claims.

What is claimed is:

1. A conduit fitting for receiving electrical wires therethrough, the combination comprising:

a first tubular member having a first end portion, a middle portion and a second end portion with a first longitudinal axis extending between said first and second end portions;

a second tubular member having a first end portion, a middle portion and a second end portion with a second longitudinal axis extending between said first and second end portions of said second tubular member; and means, coupled to said first and second tubular members, for rotatably and incrementally coupling said first end portions of said first and second tubular members together about an axis of rotation extending transversely to said first and second longitudinal axes and for resisting relative translational movement of said first and second tubular members away from one another, said means for rotatably and incrementally coupling including a first surface coupled to said first end portion of said first tubular member, a second surface coupled to said first end portion of said second tubular member and facing in a direction opposite to said first surface for slidable engagement with said first surface, said first and second surfaces defining a plane of rotation which is substantially perpendicular to said axis of rotation, and said first tubular member having connecting means, integrally formed as a unitary part of said first tubular member, for resiliently coupling said first surface to said first end portion of said first tubular member for permitting transverse biasing, said first tubular member, said connecting means and said first surface being a one piece construction, said second tubular member having a unitary, integrally formed annular flange with means for engaging and contacting said connecting means of said first tubular member to incrementally prevent relative rotation between said first and second tubular members until a rotational force is applied to transversely bias said connecting means relative to said annular flange, said means for engaging and contacting including a plurality of spaced apart inwardly extending abutments said second tubular member, said annular flange and said engaging means being a one piece construction, whereby said first and second tubular members can be rotated incrementally relative to each other between a first position where said first and second longitudinal axes are substantially parallel to form a substantially straight passageway between said first and second tubular members and a plurality of angular positions where said first and second longitudinal axes are not substantially parallel.

2. The conduit fitting according to claim 1, wherein said axis of rotation forms about a 45° angle with said first and second longitudinal axes.

3. The conduit fitting according to claim 1, wherein said plane of rotation forms about a 45° angle with said first and second longitudinal axes.

4. The conduit fitting according to claim 1, wherein said first surface of said first tubular member is inwardly biased away from said second surface of said second tubular member upon initial engagement of said first end portions and then said first surface subsequently moves outwardly into engagement with said second surface to interlock said first and second tubular members together.

5. The conduit fitting according to claim 1, wherein said first surface of said first tubular member is biased outwardly away from said second surface of said second tubular member upon initial engagement of said first end portions and then said first surface subsequently moves inwardly into engagement with said second surface to interlock said first and second tubular members during coupling of said first and second tubular member together.

6. The conduit fitting according to claim 4, wherein said second surface is formed by said flange which extends inwardly from said first end portions of said second tubular member, said flange having an internal diameter, said means for resiliently coupling said first surface to said first end portion of said first tubular member includes a plurality of spaced apart latching tabs arranged substantially in a circular array and extending outwardly from said first end portion of said first tubular member, each of said latching tabs includes a resilient wall segment having a distal end, and a tooth formed on the exterior surface of said wall segment with an inclined wall sloping outwardly away from said distal end of said wall segment and a portion of said first surface which extends between said inclined wall and said wall segment, and said first surface formed by said latching tabs defines a notch for receiving said inwardly extending flange of said second tubular member.

7. The conduit fitting according to claim 6, wherein said teeth defining a maximum outer diameter greater than the internal diameter of said inwardly extending flange for providing a snap fit between said flange and said latching tabs.

8. The conduit fitting according to claim 6, wherein each of said resilient wall segments is spaced from the adjacent resilient wall segment by a gap, and said means for engaging includes a plurality of spaced apart inwardly each one of said abutments engaging one of said gaps when said first and second tubular members are coupled together for selectively retaining said first and second tubular members in said first position and said plurality of angular positions.

9. The conduit fitting according to claim 5, wherein said second surface is formed by said flange which extends outwardly from said first end portion of said second tubular member, said flange having an outer diameter, said means for resiliently coupling said first surface to said first end portion includes an annular wall extending from said first end portion of said first tubular member to a distal end with a maximum inner diameter greater than the diameter of said outwardly extending flange, said annular wall includes a plurality of latching tabs on its interior surface with each of said latching tabs having an inclined wall sloping inwardly away from said distal end and a portion of said first surface which extends between said annular wall and said inclined wall, and said first surface formed by said latching tabs defines a notch for receiving said outwardly extending flange.

10. The conduit fitting according to claim 9, wherein said latching tabs define an opening with a minimum inner diameter smaller than the outer diameter of said outwardly extending flange for providing a snap fit between said flange and said notch.

11. The conduit fitting according to claim 10, wherein said abutments are formed by a plurality of spaced apart notches formed on the outer peripheral surface of said annular flange, and said annular wall has an inwardly extending abutment member for engaging one of said notches when said first and second tubular members are coupled together for selectively retaining said first and second tubular members in said first position and said plurality of angular positions.

12. The conduit fitting according to claim 11, further comprising
an O-ring made of elastomeric material for providing a watertight sealing between said first end portions of said first and second tubular member, and
said first end portion of said first tubular portion includes an annular groove for positioning said O-ring between said first end portions of said first and second tubular members.

13. A conduit fitting for receiving electrical wires therethrough, the combination comprising:
a first tubular member having a first end portion, a middle portion and a second end portion with a first longitudinal axis extending between said first and second end portions;
a second tubular member having a first end portion, a middle portion and a second end portion with a second longitudinal axis extending between said first and second end portions of said second tubular member; and
means, coupled to said first and second tubular members, for rotatably coupling said first end portions of said first and second tubular members together about an axis of rotation extending transversely to said first and second longitudinal axes, said means for rotatably coupling including
a resilient coupling member extending from said first end portion of said first tubular member for defining a notch, and
a flange extending from said first end portion of said second tubular member for rotatably engaging said notch of said coupling member to rotatably couple said first and second tubular members together,
said flange being sized for engaging and transversely biasing said resilient coupling member relative to said axis of rotation during coupling of said first and second tubular members,
said flange extending inwardly from said first end portion of said second tubular member and having an internal diameter,
said coupling member including a plurality of spaced apart latching tabs arranged substantially in a circular array and extending outwardly from said first end portion of said first tubular member, said latching tabs being adapted to engage said flange, each of said latching tabs including a resilient wall segment having a distal end, and a tooth being formed on the exterior surface of said wall segment with an inclined wall sloping outwardly away from said distal end of said wall segment and a first surface extending between said inclined wall and said wall segment,
said first surfaces of said latching tabs forming said notch to receive said inwardly extending flange of said second tubular member,
each of said latching tabs being spaced from the next adjacent latching tabs by a gap,
said flange having at least one inwardly extending abutment, with said abutment engaging and projecting into one of said gaps when said first and second tubular members are coupled together for selectively retaining said first and second tubular members in said first position and said plurality of angular positions,
whereby said first and second tubular members can be rotated relative to each other between a first position where said first and second longitudinal axes are substantially parallel to form a substantially straight passageway between said first and second tubular members and a plurality of angular positions where said first and second longitudinal axes are not substantially parallel.

14. The conduit fitting according to claim 13, wherein
each of said second end portions of said first and second tubular members has external threads thereon.

15. The conduit fitting according to claim 13, further comprising
a ferrule releasably coupled to said second end portion of said second tubular member, said ferrule including
an inner tubular portion,
a middle connecting portion coupled to said inner tubular portion and adapted to be received within said second end portion of said second tubular member, and
an outer tubular portion coupled to said middle connecting portion which extends coaxially to said inner tubular portion, said outer tubular portion having a plurality of resilient tines; and
a nut having internal threaded portion for threadedly engaging said external threads of said second tubular member, and a tapered internal wall portion for compressing said tines of said ferrule inwardly upon threading said nut onto said second tubular member.

16. The conduit fitting according to claim 13, wherein
said axis of rotation forms about a 45° angle with said first and second longitudinal axes.

17. The conduit fitting according to claim 13, wherein
said notch having a first surface facing in a first direction and said flange having a second surface facing in a second direction opposite to said first surface for defining a substantially planar surface of rotation which is perpendicular to said axis of rotation.

18. The conduit fitting according to claim 13, wherein
said teeth defining a maximum outer diameter greater than the internal diameter of said inwardly extending flange for providing a snap fit between said flange and said notch.

19. The conduit fitting according to claim 15, wherein
said first tubular member, said second tubular member, said ferrule and said nut are made of a plastic material.

20. The conduit fitting according to claim 18, further comprising
an O-ring made of elastomeric material for providing a watertight sealing between said first end portions of said first and second tubular members, and
said first end portion of said second tubular portion includes an annular groove for positioning said O-ring between said first end portions or said first and second tubular members.

21. A conduit fitting for receiving electrical wires therethrough, the combination comprising:
a first tubular member having a first end portion, a middle portion and a second end portion with a first longitudinal axis extending between said first and second end portions;

a second tubular member having a first end portion, a middle portion and a second end portion with a second longitudinal axis extending between said first and second end portions of said second tubular member; and means, coupled to said first and second tubular members, for incrementally and rotatably coupling said first end portions of said first and second tubular members together about an axis of rotation extending transversely to said first and second longitudinal axes, said means for incrementally and rotatably coupling including a first surface coupled to said first end portion of said first tubular member, a second surface coupled to said first end portion of said second tubular member and facing in a direction opposite to said first surface for slidable engagement with said first surface and for resisting relative translational movement of said first and second tubular members away from one another, an abutment member integrally formed as a unitary part of one of said tubular members for engaging a unitary, integrally formed portion of the other of said tubular members to prevent relative rotation between said first and second tubular members until a rotational force is applied to transversely bias said abutment member relative to the other of said tubular members, said first and second surfaces defining a plane of rotation which is substantially perpendicular to said axis of rotation, and said first tubular member having means for resiliently coupling said first surface to said first end portion of said first tubular member for permitting transverse biasing of said first surface relative to said second surface during coupling of said first and second tubular members, whereby said first and second tubular members can be incrementally rotated relative to each other between a first position where said first and second longitudinal axes are substantially parallel to form a substantially straight passageway between said first and second tubular members and a plurality of angular positions where said first and second longitudinal axes are not substantially parallel.

22. The conduit fitting according to claim 21, wherein
said first surface of said first tubular member is inwardly biased away from said second surface of said second tubular member upon initial engagement of said first end portions and then said first surface subsequently moves outwardly into engagement with said second surface to interlock said first and second tubular members together.

23. The conduit fitting according to claim 21, wherein
said first surface of said first tubular member is biased outwardly away from said second surface of said second tubular member upon initial engagement of said first end portions and then said first surface subsequently moves inwardly into engagement with said second surface to interlock said first and second tubular members during coupling of said first and second tubular member together.

24. The conduit fitting according to claim 22, wherein
said second surface is formed by a flange extending inwardly from said first end portion of said second tubular member, said flange having an internal diameter, said means for resiliently coupling said first surface to said first end portion of said first tubular member includes a plurality of spaced apart latching tabs arranged substantially in a circular array and extending outwardly from said first end portion of said first tubular member, each of said latching tabs includes
a resilient wall segment having a distal end, and
a tooth formed on the exterior surface of said wall segment with an inclined wall sloping outwardly away from said distal end of said wall segment and a portion of said first surface which extends between said inclined wall and said wall segment, and said first surface formed by said latching tabs defines a notch for receiving said inwardly extending flange of said second tubular member.

25. The conduit fitting according to claim 24, wherein
said teeth defining a maximum outer diameter greater than the internal diameter of said inwardly extending flange for providing a snap fit between said flange and said latching tabs.

26. The conduit fitting according to claim 24, wherein
each of said resilient wall segments is spaced from the adjacent resilient wall segment by a gap, and
said flange has a plurality of said abutment members spaced apart which extend inwardly, with each one of said abutment members engaging one of said gaps when said first and second tubular members are coupled together for selectively retaining said first and second tubular members in said first position and said plurality of angular positions.

27. The conduit fitting according to claim 23, wherein
said second surface is formed by a flange extending outwardly from said first end portion of said second tubular member, said flange having an outer diameter, said means for resiliently coupling said first surface to said first end portion includes an annular wall extending from said first end portion of said first tubular member to a distal end with a maximum inner diameter greater than the diameter of said outwardly extending flange, said annular wall includes a plurality of latching tabs on its interior surface with each of said latching tabs having an inclined wall sloping inwardly away from said distal end and a portion of said first surface which extends between said annular wall and said inclined wall, and said first surface formed by said latching tabs defines a notch for receiving said outwardly extending flange.

28. The conduit fitting according to claim 27, wherein
said latching tabs define an opening with a minimum inner diameter smaller than the outer diameter of said outwardly extending flange for providing a snap fit between said flange and said notch.

29. The conduit fitting according to claim 28, wherein
   said flange has a plurality of spaced apart notches formed on its outer peripheral surface, and said annular wall has said abutment member formed thereon for engaging one of said notches when said first and second tubular members are coupled together for selectively retaining said first and second tubular members in said first position and said plurality of angular positions.

30. A method of angulating a conduit fitting for receiving electrical wires therethrough, comprising the steps of
   coupling a first tubular member having a resilient coupling member with a first coupling surface to a second tubular member having a second coupling surface thereon for forming a substantially straight passageway between the first and second tubular members, by transversely biasing the first coupling surface relative to the second coupling surface during coupling of the first and second tubular member and for defining a plane of rotation between said first and second coupling surfaces,
   inserting electrical wires through the substantially straight passageway of the first and second tubular members, and
   rotating the first tubular member relative to the second tubular member about the plane of rotation to angulate the first tubular member relative to the second tubular member at the plane of rotation by biasing transversely an abutment member formed on one of the tubular members relative to the other of the tubular members for incrementally rotating the first tubular member relative to the second tubular member.

31. The method of angulating a conduit fitting according to claim 30, wherein the step of coupling includes the step of
   initially biasing the resilient coupling member inwardly during coupling of said first and second tubular members.

32. The method of angulating a conduit fitting according to claim 30, wherein the step of coupling includes the step of
   initially biasing the resilient coupling member outwardly during coupling of said first and second tubular members.

33. A conduit fitting for receiving electrical wires therethrough, the combination comprising:
   a first tubular member having a first end portion, a middle portion and a second end portion with a first longitudinal axis extending between said first and second end portions;
   a second tubular member having a first end portion, a middle portion and a second end portion with a second longitudinal axis extending between said first and second end portions of said second tubular member; and
   means, coupled to said first and second tubular members, for rotatably coupling said first end portions of said first and second tubular members together about an axis of rotation extending transversely to said first and second longitudinal axes, said means for rotatably coupling including
      a resilient coupling member extending from said first end portion of said first tubular member for defining a notch, said notch having a first surface facing in a first direction, and
      a flange extending outwardly from said first end portion of said second tubular member and away from said axis of rotation for rotatably engaging said notch of said coupling member to rotatably couple said first and second tubular members together,
      said flange having a second surface facing in a second direction opposite to said first surface for defining a substantially planar surface of rotation which is perpendicular to said axis of rotation, and an outer diameter sized for engaging and transversely biasing said resilient coupling member relative to said axis of rotation during coupling of said first and second tubular members,
      said resilient coupling member comprising an annular wall extending from said first end portion of said first tubular member to a distal end with a maximum inner diameter greater than the maximum outer diameter of said outwardly extending flange,
      said annular wall including a plurality of latching tabs on its interior surface extending inwardly from said annular wall towards said axis of rotation with each of said latching tabs having an inclined wall sloping inwardly away from said distal end with said first surface extending between said annular wall and said inclined wall,
      said first surface and said annular wall forming said notch for receiving said outwardly extending flange,
   whereby said first and second tubular members can be rotated relative to each other between a first position where said first and second longitudinal axes are substantially parallel to form a substantially straight passageway between said first and second tubular members and a plurality of angular positions where said first and second longitudinal axes are not substantially parallel.

34. The conduit fitting according to claim 33, wherein
   said latching tabs defining a minimum inner diameter smaller than the maximum outer diameter of said outwardly extending flange for providing a snap fit between said flange and said notch.

35. The conduit fitting according to claim 34, wherein
   said flange has a plurality of spaced apart notches formed on its peripheral surface and said annular wall has an inwardly extending abutment member for engaging one of said notches when said first and second tubular members are coupled together, thereby selectively retaining said first and second tubular members in said first position and said plurality of angular positions.

36. The conduit fitting according to claim 35, further comprising
   an O-ring made of elastomeric material for providing a watertight sealing between said first ends of said first and second tubular members, and
   said first end portion of said first tubular portion includes an annular groove for positioning said O-ring between said first end portions of said first and second tubular members.

* * * * *